(12) United States Patent  (10) Patent No.: US 9,342,703 B2
Simoncelli  (45) Date of Patent: May 17, 2016

(54) MANAGING STORAGE PERMISSIONS FOR LOGICAL VOLUME MANAGERS

(71) Applicant: Red Hat Israel, Ltd., Raanana (IL)

(72) Inventor: Federico Simoncelli, Fano (IT)

(73) Assignee: Red Hat Israel, Ltd., Raanana (IL)

( * ) Notice: Subject to any disclaimer, the term of this patent is extended or adjusted under 35 U.S.C. 154(b) by 239 days.

(21) Appl. No.: 13/691,198

(22) Filed: Nov. 30, 2012

(65) Prior Publication Data

US 2014/0156960 A1  Jun. 5, 2014

(51) Int. Cl.
*G06F 21/60* (2013.01)
*G06F 21/62* (2013.01)
*G06F 12/14* (2006.01)

(52) U.S. Cl.
CPC .......... *G06F 21/604* (2013.01); *G06F 12/1458* (2013.01); *G06F 21/6218* (2013.01); *G06F 2221/2141* (2013.01); *G06F 2221/2145* (2013.01)

(58) Field of Classification Search
CPC .................................................. G06F 21/604
See application file for complete search history.

(56) References Cited

U.S. PATENT DOCUMENTS

| | | | | |
|---|---|---|---|---|
| 7,761,489 B2* | 7/2010 | Furukawa et al. | ............ | 707/823 |
| 2010/0198804 A1* | 8/2010 | Yaskin et al. | ................. | 707/706 |
| 2010/0257206 A1* | 10/2010 | Brown et al. | ................. | 707/784 |
| 2010/0299495 A1* | 11/2010 | Frank | ............................ | 711/170 |
| 2011/0126061 A1* | 5/2011 | Worner et al. | .................. | 714/57 |
| 2012/0216002 A1* | 8/2012 | Moyer et al. | ................. | 711/163 |

* cited by examiner

*Primary Examiner* — Tuan Thai
*Assistant Examiner* — Glenn Gossage
(74) *Attorney, Agent, or Firm* — Lowenstein Sandler LLP (57) ABSTRACT

A logical volume manager (LVM) may manage a plurality of logical volumes and a plurality of drives in a logical data storage using metadata stored on the plurality of drives. The metadata (e.g., global metadata) may include a first set of permissions for a storage location in one of the logical volumes. The LVM may analyze permission data (e.g., local permission data) associated with the storage location and may override the metadata (e.g., the permissions in the global metadata) with a second set of permissions obtained from the permission data. The LVM may use the second set of permission data to access the storage location (e.g., a logical volume, logical volume group, file, partition directory/folder, set of data blocks). Permission data may be generated based on an identifier for a virtual machine, computing device, or user, and may be generated based on user input.

20 Claims, 5 Drawing Sheets

FIG. 1

| Location | Permissions | Identifier |
|---|---|---|
| /root/library1/ | Read Only | user_vm1 |
| /root/library2/ | Read-Write | sw_dev_vm1 |
| Partition p_001 | Read-Write | * |
| Volume lv_002 | Read Only | MyPC1 |
| /root/documents/report.file | Read Only | * |
| /root/earnings_reports/2012.file | No permissions | john_smith |

TABLE 210

PERMISSION DATA 200

MANAGING STORAGE PERMISSIONS FOR LOGICAL VOLUME MANAGERS

TECHNICAL FIELD

Embodiments of the present disclosure relate to a computer system, and more specifically, to logical volume managers.

BACKGROUND

Many network architectures use virtual machines (VMs) and physical machines (e.g., a laptop computer, a desktop computer, a tablet computer, a network, a computer system, a computing device, etc.) to perform various functions and tasks. A virtual machine (VM) is a software implementation of a machine (computer) that includes its own operating system (referred to as a guest operating system) and executes application programs. A host computer allocates a certain amount of its resources to each of the virtual machines, and multiplexes its underlying hardware platform among the virtual machines. Each virtual machine may be able to use the allocated resources to execute its guest operating system and applications. The software layer providing the virtualization is commonly referred to as a hypervisor and is also known as a virtual machine monitor (VMM), a kernel-based hypervisor, or part of a host operating system. The hypervisor emulates the underlying hardware of the host computer, making the use of the virtual machine transparent to the guest operating system and the user of the computer. A host controller (e.g., a server) may manage (e.g., create/remove virtual machines, shut down virtual machines), monitor (e.g., monitor system resources used by hosts and/or virtual machines), configure (e.g., change hardware, software and/or guest operating systems on virtual machines), and/or control the virtual machines.

The VMs and/or the physical machines may use multiple drives (e.g., hard disk drives, flash drives, disc drives, mass storage devices, etc.) located on one or more computing devices (e.g., server computers), to store and/or access data, applications, files, etc. The VMs and/or the physical machines may use logical volume managers (LVMs) to manage, allocate, and use the multiple drives. An LVM may allow multiple drives to be partitioned, allocated, and/or organized according to a logical organization or structure. This may allow the LVM to create logical volumes (e.g., a virtual disk partition) according to the preferences or requirements of users (e.g., administrators and/or other people using the VMs and physical machines). The LVM may use metadata on the drives to store the configuration details of the logical volume groups. The metadata may also include permissions (e.g., read and/or write permissions) for storage locations (e.g., a logical volume, a logical volume group, a file, a directory/folder, a set of data blocks). For example, the metadata may indicate that a logical volume should be read only (e.g., data cannot be written to the logical volume).

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are systems and methods of managing permission for LVMs (e.g., logical volume managers). LVMs use metadata stored on one or more drives to create, manage and/or access volume groups and/or logical volumes in a logical data storage. The metadata may include permissions (or a set of permissions) for storage locations (e.g., a logical volume) in the logical data storage. In one embodiment, the metadata may be global to all of the LVMs that use the logical data store (e.g., all of the LVMs may access and/or use the metadata). A storage location may be one or more of a file, a directory, a partition, a logical volume, a logical volume group, and/or a set of data blocks on one or more of the drives in the logical data storage. Although the following disclosure may refer to storage locations as logical volumes for ease of discussion, storage locations are not meant to be limited to embodiments of the disclosure and storage locations may include files, directories, partitions, logical volumes, logical volume groups, data blocks, and/or any portion of a drive or storage device. Because multiple LVMs may access and/or manage the logical data storage, many or most of the storage locations in the logical data storage may include read permissions and write permissions (e.g., read and write operations are allowed to the storage locations). However, the permissions in the metadata are global to all of the LVMs that use the logical storage location. Thus, if an LVM wants to change the permissions for a storage location (e.g., change the permission for a logical volume to read-only for a particular user or VM), the LVM may need to send a request to a managing LVM to change the metadata for that storage location and the changed metadata will be used globally by all LVMs. Changing the permissions in the metadata may also be a costly, inefficient and/or time consuming operation.

In one embodiment, each LVM may use permission data when accessing and/or granting access to a storage location. The permission data may include permissions for a storage location that are different from the permissions in the metadata. The permission data may also include different permissions to storage locations for different users, VMs, and/or computing devices. The LVM may override the permissions in the metadata by using the permissions in the local permission data (e.g., permission data that is locally stored on each host) in place of or instead of the permission in the metadata. This may allow an LVM to control the permission to a storage location without having to send a request to a managing LVM to change the permissions in the metadata for the storage location. The permission data may be locally stored (e.g., stored in a local memory) and may be quickly updated and/or changed by the LVM.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

Figure 1:
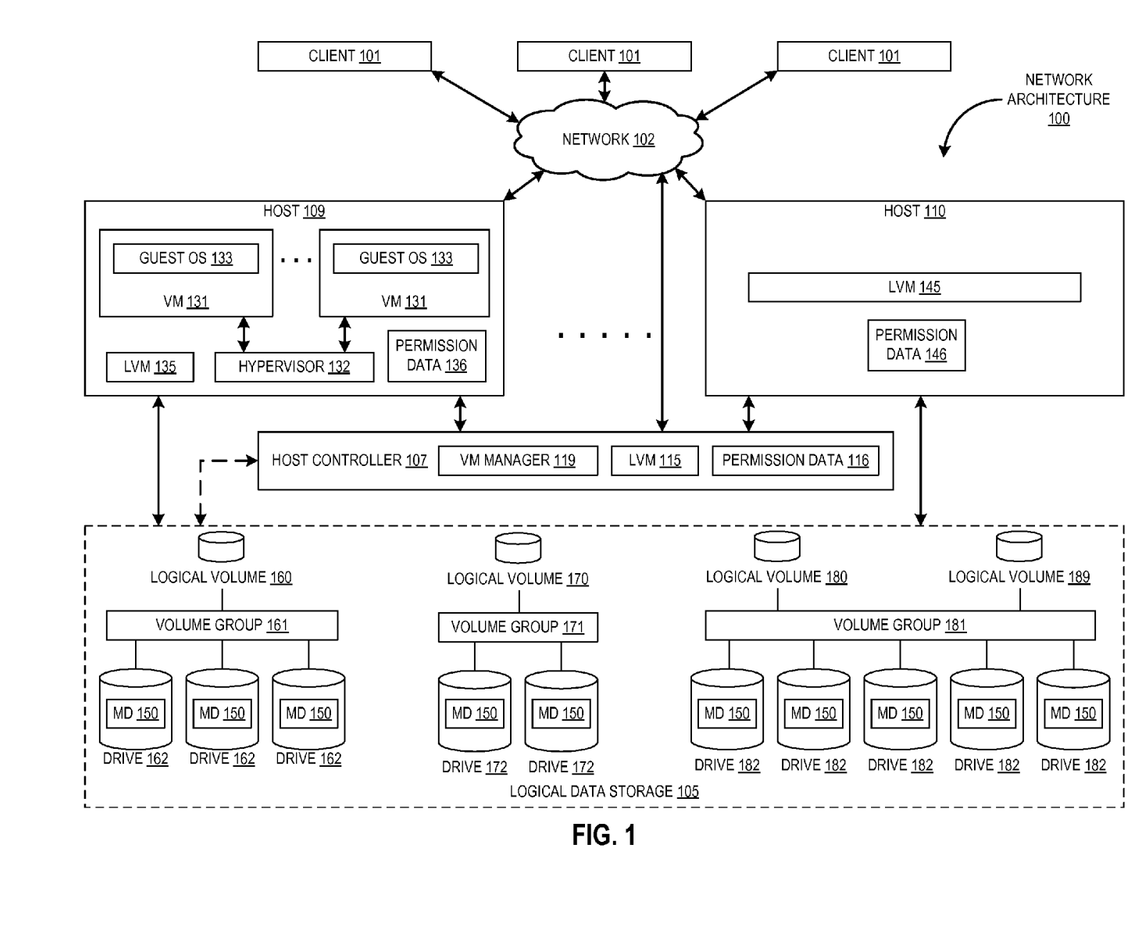
FIG. 1 is a block diagram illustrating an example network architecture in which embodiments of the disclosure may operate.

FIG. 1 is a block diagram illustrating an example network architecture 100 in which embodiments of the present disclosure may operate. The network architecture 100 includes hosts 109 and 110 coupled to clients 101 over a network 102. The hosts 109 and 110 may be a personal computer (PC), a server computer, a personal digital assistant (PDA), a smart phone, a laptop computer, a tablet computer, or any machine capable of executing a set of instructions (sequential or otherwise) that specify actions to be taken by that machine. The network 102 may be one or more of a private network (e.g., a local area network (LAN), a wide area network (WAN), intranet, etc.), a wireless network (e.g., a Wi-Fi network or a cellular network), or a public network (e.g., the Internet). The hosts 109 and 110 are coupled to a host controller 107. Host 109 includes LVM 135, host 110 includes LVM 145, and host controller 107 includes LVM 115. The hosts 109 and 110 are coupled to logical data storage 105. In one embodiment, the host controller 107 may also be coupled to the logical data storage 105. The logical data storage 105 includes drives 162, drives 172, and drives 182. The hosts 109 and 110, and the host controller 107 may use their corresponding LVMs (e.g., LVM 135, LVM 145, and LVM 115) to access and/or manage the drives 162, 172, 182, and the logical data storage 105.

The host 109 may host one or more virtual machines (VMs) 131. Each virtual machine (VM) 131 includes a guest operating system (guest OS) 133 that may be different from one virtual machine to another. The guest OS 133 may include, but is not limited to, a Microsoft Windows® OS, a Linux® OS, a UNIX-based OS, a Solaris® OS, a Mac® OS, Fedora, etc. In one embodiment, the guest OS 133 (e.g., the files, libraries, packages, kernel, etc., for the guest OS 133) may not be stored on the host 109, but may be stored in the logical data storage 105 (e.g., within volume group 181 of the logical data storage 105). The host 109 may include a hypervisor 132 that emulates the underlying hardware platform for the VMs 131. The hypervisor 132 may also be known as a virtual machine monitor (VMM) or a kernel-based hypervisor. In some embodiments, the hypervisor 132 may be part of a host operating system. Although FIG. 1 shows one host 109, in other embodiments, the network architecture 100 may include multiple hosts 109, with each host 109 including a hypervisor (e.g., hypervisor 132) and one or more VMs (e.g., VM 131). In one embodiment, each of the VMs 131 may access the logical data storage 105 (e.g., read or write data to the logical data storage) using the LVM 135. In another embodiment, each of the VMs 131 may also include an LVM and each VM 131 may use its own LVM, rather than LVM 135, to access the logical data storage 105.

The host 109 also includes an LVM 135 (e.g., a logical volume manager). As discussed above the LVM 135 may manage, allocate, and use the drives 162, 172, and 182 in the logical data storage 105. The LVM 135 may partition, allocate, and/or organize the drives 162, 172 and 182 according to a logical organization or structure. This allows the LVM 135 to create logical volumes (e.g., logical volumes 160, 170, 180 and 189) according to the preferences or requirements of users (e.g., administrators or other people using the VMs 131 or the hosts 109 and 110).

The LVM 135 may group drives 162, 172, and 182 together to form one or more volume groups (e.g., a pool of storage space from one or more drives). The drives 162 are grouped together to form volume group 161, the drives 172 are grouped together to form volume group 171, and the drives 182 are grouped together to form volume group 181. In one embodiment, portions of the drives 162, 172, and/or 182 may be grouped together to form one or more volume groups (not shown in the figure). For example, a portion of drive 162 and a portion of drive 172 may be grouped together to form a volume group. The LVM may use the volume groups 161, 171, and 181 to create one or more logical volumes 160, 170, 180, and 189. A logical volume may be a virtual disk partition (e.g., a partition that may not be based on actual physical partitions and/or physical drives). This may allow the LVM 135 to create logical volumes according to the preferences or requirements of users (e.g., administrators or other people using the VMs 131 and hosts 109 and 110). For example, if a 9 gigabyte (GB) storage space is required by a user, the LVM may form a 9 GB logical volume from three different physical drives, each drive being 3 GB in size. The VMs 131 and/or the host 109 may access the logical volumes 160, 170, 180, and 189 using the LVM 135, as if it were a single physical volume, partition, and/or drive.

The LVM 135 may use metadata (MD or LVM metadata) 150 to store the configuration details of the logical volumes 160, 170, 180, and 189. For example, the metadata 150 may store information such as which partitions and/or portions of the (physical) drives 162, 172, and/or 182 are mapped to (e.g., belong to) which logical volume, and/or the storage parameters of the logical volumes (e.g., block size, track size, sector size, etc.). The metadata 150 stored on the drives 162 may indicate that the drives 162 are part of logical volume 160. The metadata 150 stored on the drives 172 may indicate that the drives 172 are part of logical volume 170. The metadata 150 stored on the drives 182 may indicate that the drives 182 are part of logical volumes 180 and 189. For example, two of the drives 182 may be part of logical volume 180 and three of the drives 182 may be part of logical volume 189. In another example, some parts of the drives 182 may be part of logical volume 180 and the remaining parts of the drives 182 may be part of the logical volume 189. In one embodiment, the metadata 150 may indicate a mapping between the drives 162, 172, and 182, and the logical volumes 160, 170, 180, and 189 (e.g., may indicate which drives or portions of the drives are mapped to or used by which logical volumes). The metadata 150 may be global metadata (e.g., metadata that is accessible and/or used by LVMs 135, 145, and 115.

In one embodiment, the VM 131 may use the LVM 135 to access (or request access to) the logical data storage 105. For example, the VM 131 may request to read data that is stored in the volume group 161. The VM 131 may use the LVM 135 (e.g., via the hypervisor 132) to determine which of the drives 162 the data is stored on and may read the data (e.g., read data in from a file) from the volume group 161. In another example, the VM 131 may request to update data that is stored in a volume group 161 and/or to add a new data to the volume group 161 (e.g., add a new file to a directory or folder logical volume in the volume group 161). The VM 131 may use the LVM 135 (e.g., via the hypervisor 132) to determine which of the drives 162 the file is stored on and may update the file or the VM 131 may use the LVM to determine which of the drives 162 are used by the directory and may add a file to one of the drives 162.

The global metadata (e.g., metadata 150) used by the LVMs (e.g., LVMs 135, 145, and 115) may also include permissions (e.g., read and/or write permissions indicating whether read and/or write operations are allowed) for storage locations in the logical volumes 160, 170, and 180. For example, a whole logical volume (e.g., logical volume 160) may have read-only permissions (e.g., read operations such as reading data are allowed, but write operations such as updating or writing data are not allowed). In another example, the logical volume 160 may have read permissions and write permissions (e.g., both read operations and write operations are allowed in the logical volume). A storage location may be one or more of a file, a directory, a partition, a logical volume, and/or a set of data blocks on one or more of the drives 162, 172, and 182 in the logical data storage 105. Generally, LVMs (e.g., LVM 135) will allow access and/or operations to storage locations (e.g., a logical volume) within a volume group (e.g., volume group 161) based on the permissions in the global metadata (e.g., metadata 150). For example, if the metadata 150 allows only read operations to a logical volume in the volume group 161, the LVM 135 may prevent the VM 131 from writing data to that logical volume.

When a group of LVMs (e.g., LVMs 135, 145, and 115) share a logical data storage, one of the LVMs may be selected as a managing LVM. For example, out of the LVMs 135, 145, and 115, the LVM 115 may be selected to be the managing LVM because the LVM 115 resides on the host controller 107 and the host controller 107 may manage the hosts 109 and 110 (e.g., may manage the VMs 131 on the host 109 and/or may manage the operation of the hosts 109 and 110). In one embodiment, the managing LVM may be the only LVM that is allowed to change the global metadata 150 (e.g., update the metadata 150 to add a new logical volume, update the metadata to change the permissions for a storage location, etc.).

Generally, the permissions included in the metadata 150 may be global for all of the LVMs (e.g., LVM 135, 145, and 115). For example, if the metadata 150 indicates that a storage location (e.g., logical volume) on the drive 162 has read and write permissions, then all of the hosts and/or VMs 131 that use LVMs 135, 145, and 115 may be able to read and write data to the storage location. Because any one of the LVMs 135, 145, and 115 may be used to access, manage, and/or update the logical data storage 105, the permissions in the metadata 150 are generally set to allow read and write operations for many or most of the storage locations (e.g., logical volume groups, logical volumes) in the logical data storage 105. However, a user (e.g., a user that is using a VM 131 or a system administrator that is using host controller 107) may not want certain storage locations (e.g., certain logical volumes) to have both read and write permissions. For example, a logical volume of the volume group 171 may store templates or important files (e.g., operating system install files, library install files, a template configuration for a VM, etc.) that are used by multiple VMs 131. Although the metadata 150 may indicate that the read and write operations may be allowed to the logical volume, a user (e.g., a system administrator) may not want other users (e.g., normal users or other VMs 13) to make changes to the files (e.g., may not want users to accidentally overwrite the files) and/or the system administrator may only want certain users (e.g., certain hosts or VMs) to be able to make changes to the files. In order for an LVM to change the permissions in the metadata 150 for a storage location (e.g., change from read only permissions to read/write permissions, or vice versa), the LVM (e.g., LVM 135) may send a request to a managing LVM (e.g., LVM 115) that is allowed to update, delete, and/or modify the metadata 150. Sending these requests to the managing LVM may be inefficient and/or costly, because the other LVMs may frequently update permissions for storage locations. For example, the LVM 135 may request to the managing LVM to set permissions for different storage locations based on the individual VMs 131. As each VM 131 is started on the host 109, the LVM 135 may send a request to set the permissions for the different storage locations used by each VM 131. Sending these requests to the managing LVM may also be inefficient and/or costly because the managing LVM may need to change multiple metadata 150 (e.g., the metadata 150 stored on drives 182) in order to update the permissions and this may prevent the storage locations from being accessed while the metadata 150 is being updated.

The host 109 also includes permission data 136 (e.g., local permission data that is stored on the host 109). The local permission data 136 may be local data that is indicative of a list of storage locations and permissions for the storage locations. For example, the local permission data 136 may indicate that a partition in the volume group 161 should be read-only (e.g., data on the partition cannot be modified and new data cannot be written to the partition). In another example, the local permission data 136 may indicate that a logical volume has read-write permissions (e.g., both read operations and write operations are allowed to the logical volume). In a further example, the local permission data 136 may indicate that a logical volume (e.g., a logical volume that stores install files for an operating system or a library) should be read-only (e.g., no write operations are allowed to the logical volume).

In one embodiment, the LVM 135 may use the permissions in the local permission data 136 in place of or instead of the permissions in the metadata 150, when accessing storage locations in the logical data storage 105. For example, the metadata 150 for a logical volume located in volume group 161 may indicate that the logical volume has read-write permissions (e.g., that both read operations and write operations are allowed to the logical volume). However, the local permission data 136 may indicate that the logical volume located in volume group 161 should have read permissions instead (e.g., only read operations should be allowed to the logical volume). When a VM 131 uses the LVM 135 to access the logical volume (e.g., send a request to the LVM to access the logical volume), the LVM 135 may only allow read operations to the logical volume (e.g., listing files in the logical volume, listing directories or sub-directories in the logical volume, reading a file in the logical volume, etc.) but may prevent write operations (e.g., deleting a file or a sub-directory in the logical volume, updating a file in the logical volume, etc.). Because the LVM 135 may use the permissions in the local permission data 136 (e.g., the LVM 136 may override the permissions in the metadata 150 with the permission in the local permission data 136), a managing LVM (e.g., LVM 115) may keep read and write permissions in the metadata 150. Instead of changing the metadata 150 each time another LVM (e.g., LVM 135) wants to change the permissions for a storage location, the other LVM may use permission data (e.g., local permission data 136) to control access to the storage locations. This may allow the other LVM to override the permissions that are in the metadata 150 and use the permissions that are in the local permission data 136 instead. In one embodiment, the local permission data 136 may include or allow more permissions (e.g., read and write permissions) than the permissions included or allowed by the LVM metadata 150 (e.g., read only permissions).

In one embodiment, the local permission data 136 may be received from a managing LVM (e.g., LVM 115 in host controller 107) and/or a computing device (e.g., a server computer). For example, the managing LVM may identify different storage locations and may identify permissions for the different storage locations (e.g., read only, read-write, etc.). The storage locations and the permissions for the different storage locations may also be identified based on user input (e.g., a user, such as a system administrator may provide input via a graphical user interface (GUI)). The managing LVM may include the storage locations and their associated permissions in the local permission data 136 and may provide the local permission data 136 to the host 109 (e.g., may transmit the permission data 136 to the host 109 via the network 102).

In one embodiment, the host 109 may generate the local permission data 136. For example, the host 109 may receive user input (e.g., from a system administrator using a GUI) and may generate the local permission data 136 based on the user input. In another example, the host 109 may generate the permission data based on the one or more VMs 131. The host 109 may analyze characteristics of a VM 131, including but not limited to an identifier for the VM 131 (e.g., a name), the virtual hardware on the VM 131, the software (e.g., guest OS, applications, libraries, drivers, packages, etc.) used by the VM 131, and/or a user associated with the VM 131 (e.g., the user that will be using the VM 131), etc. The host 109 may generate the permission data 136 based on the characteristics of the VM 131. For example, the host 109 may generate permission data that allows a VM 131 read-write access to a storage location because the user associated with the VM 131 is a system administrator. In another example, the host 109 may generate permission data that allows a VM 131 read-only access to a storage location because the identifier (e.g., a name for the VM 131) for the VM 131 indicates that the VM 131 is a temporary VM used by a temporary employee and that the temporary VM should not be granted write access to the storage location. In another embodiment, a managing LVM (e.g., LVM 115) may generate the permission data based on the characteristics of one or more VMs on a host and may provide the permission data to the host (e.g., transmit the permission data to the host).

As discussed above, when a group of LVMs share a logical data storage, one of the LVMs may be a managing LVM that is allowed to change the metadata for the logical data storage. In one embodiment, the managing LVM may not override the permissions in the metadata with the permissions in a local permission data. For example, the managing LVM may use the permissions in the metadata and may ignore or may not use the permission in local permission data. This may allow the managing LVM to manage, modify, and/or update the data in the logical data storage. For example, the managing LVM may be used by a system administrator to update a set of files used by a guest operating system because the files are older and a new version of the files is available. Because the managing LVM may be updating, modifying, and/or managing the logical data storage (e.g., the data in the logical data storage), the managing LVM may ignore the local permission data and use the permissions in the metadata for the logical data storage instead.

The LVM 145 on the host 110 and the LVM 115 on the host controller 107 may perform operations, functions, and services, similar to those described for LVM 135. For example, each of the LVMs 145 and 115 may be used to manage, access, update, and/or modify the logical data storage 105. In another example, the host 110 may use the LVM 145 to access data (e.g., read and/or write data) stored on a logical volume (e.g., on one or more of the drives 162, 172, and 182) using one or more of metadata (e.g., metadata 150) and permission data (e.g., local permission data 146).

As discussed above, in one embodiment, a managing LVM may be selected from a group of LVMs that share access to a logical data storage. For example, a central computing device or computing system may (e.g., host controller 107) may select one of the LVMs in a group of LVMs (e.g., LVM 135, 145, and 115) to be the managing LVM. The central computing device/system may later select a different LVM to be the managing LVM after a period of time. In another example, the different LVMs may work in combination with each other to select one of the LVMs to be the managing LVM. The different LVMs may communicate with each other to determine which one of the different LVMs should be the managing LVM using a variety of methods, algorithms, and/or functions including, but not limited to, a leader election algorithm, a time-based scheduling algorithm, a priority-based scheduling algorithm, a first in first out scheduling algorithm, and/or a sequential algorithm that selects the next LVM from a list of LVMs. If an LVM is selected to be a managing LVM, the selected LVM may receive a message, an indication, and or other data indicating that the selected LVM is now the managing LVM. For example, a previous managing LVM may send a message to another LVM indicating that the other LVM is now the managing LVM.

The host 110 may be a computer system or computing device that may be used by a client 101 or other users in the network architecture 100. For example, the host 110 may be a desktop computer or a laptop computer that is part of the network architecture 100. As discussed above, the host 110 may use the LVM 145 to access, write, read and/or store data in the logical data storage 105 (e.g., store data on the logical volume 160 or read data from the logical volume 180). In another embodiment, the host 110 may be used to access, write, read and/or store data in the logical data storage 105 for one of the clients 101.

The clients 101 may include computing devices that have a wide range of processing capabilities such as PCs, PDAs, smart phones, laptop computers, etc. The clients 101 may access the VMs 131 over the network 102. In one scenario, each VM 131 provides a virtual desktop for a client 101. From the user's point of view, the virtual desktop functions as a physical desktop (e.g., a personal computer) and is indistinguishable from a physical desktop.

The host 109 may be managed by a host controller 107. The host controller 107 may be a computer coupled to the host 109 directly or via the network 102. The host controller 107 may also be in communication with the clients 101, via the network 102. Alternatively, the host controller 107 may be part of one of the hosts 109 or 110. In one embodiment, the host controller may include a VM manager 119. The VM manager 119 may add, remove, configure and/or modify the VMs 131 and/or the host 109. For example, VM manager 119 may add a new VM, remove an existing VM, change or reconfigure a VM (e.g., add/remove/replace virtual hardware), power on/off the host 109, provide directory service to the VMs 131, and perform other managerial functions. As discussed above, the host controller 107 may use the LVM 115 to access, write, read and/or store data in the logical data storage 105 (e.g., store data on the logical volume 170 or read data from the logical volume 189) using one or more of metadata (e.g., metadata 150) and permission data (e.g., local permission data 116).

The host controller 107 includes a VM manager 119 to monitor, configure, and/or manage the VMs 131. In one embodiment, the VM manager 119 may use a module, or tool to analyze a VM 131 and determine the guest OS used by the VM 131, the virtual hardware components installed on the VM 131, and/or the software installed on the VM 131. In another embodiment, the VM manager 119 may reconfigure a VM 131 (e.g., add and/or change virtual hardware components). For example, the VM manager 119 may add new virtual hardware component to a VM 131. In another example, the VM manager 119 may remove a virtual hardware component from the VM 131. In a further example, the VM manager 119 may add, remove, and/or update software (e.g., an application, an operating system, a module, a driver, etc.) installed on the VM 131.

In one embodiment, the VM manager 119, the VMs 131, and the hypervisor 132 may communicate with each other using a virtio-serial mechanism, which may be a mechanism for communication in a virtualization system via multiple generic channels of a paravirtualized device. More specifically, a virtio-serial mechanism may provide a transport mechanism in a host machine for communication between the host userspace and/or kernelspace and the VM userspace and/or kernelspace. This transport mechanism may be a communication channel between the host machine and the VM with support for multiple ports, where stream input/output (I/O) is provided on each port. The transport mechanism may have two parts: (1) device emulation in the hypervisor that presents a device to the VM, and (2) a VM device driver that presents an interface to userspace or kernelspace applications on the VM in order to communicate with the hypervisor, to programs external to the hypervisor, and/or with other VMs. The communication channel may be virtio-based, where virtio is an abstraction over a native bus for an architecture so that virtio-based devices can be used for VM-host paravirtual communication, irrespective of the architecture of the VM or the host. For example, virtio is emulated on top of a Peripheral Component Interconnect (PCI) on x86, whereas it uses a native bus on the s390 architecture. Alternatively, the VM manager 119, the hypervisor 132, and the VMs 131 may communicate using any other communication mechanism allowing exchange of messages between a virtual machine and a host controller.

Figure 2:
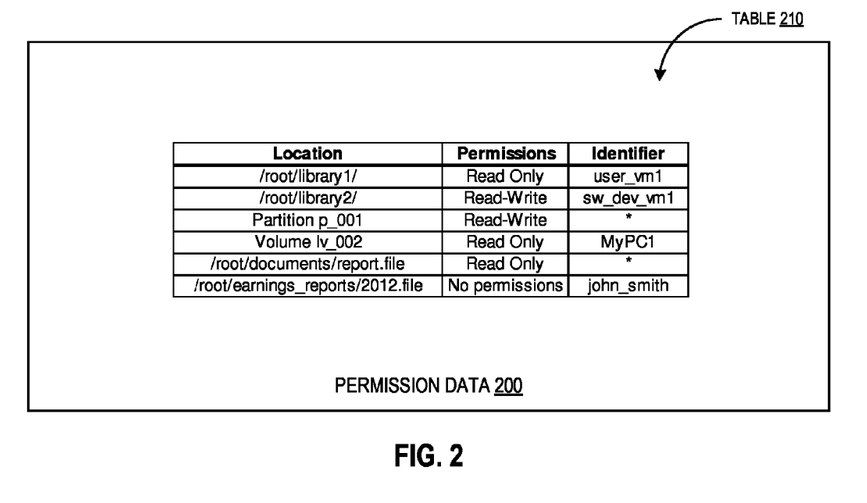
FIG. 2 is a diagram illustrating an example permission data, according to one embodiment.

FIG. 2 is a diagram illustrating an example permission data 200, according to one embodiment. The local permission data 200 may be locally stored (e.g., stored in a local memory such as a hard disk, flash memory, flash drive, random access memory (RAM), etc.) on a computing device (e.g., host 109 as shown in FIG. 1). The permission data 200 (e.g., local permission data) includes a table 210. The table 210 includes three columns. The first column is the "Location" column and indicates a storage location (e.g., a logical volume, etc.). The second column is the "Permissions" column and indicates a permission and/or a set of permissions (e.g., read only permissions, read and write permissions (read-write), or no permissions). The third column is the "Identifier" column and indicates an identifier for a VM, a computing device, and/or a user of a VM/computing device.

Each row in the table 210 indicates a storage location (e.g., a file, a directory, a logical volume, a volume group, etc.), the permissions that are allowed for the storage location, and an identifier associated with the storage location and the permissions for the storage location. For example, the first row indicates that a VM with the identifier "user_vm1" should be granted read-only permissions to the directory "/root/library1/." In another example, the fourth row indicates that the computing device with the identifier "MyPC1" should be granted read-only permissions to the partition "lv_002." In a further example, the sixth row indicates that a user with an identifier (e.g., a login name or a screen name) of "john_smith" should be granted no permissions (e.g., no read permissions and no write permissions) to the file "2012.file" located in the "/root/earnings_reports/" directory.

In one embodiment, the identifier in a row may also be a wildcard. A wildcard may be a symbol, text, and/or other value that may be used to indicate multiple identifiers. For example, the identifier in the third row is a "*" symbol. The "*" symbol may be used to indicate any identifier for any VM, any computing device, and/or any user should be granted permissions to a storage location. For example, the third row indicates that any user, any computing device, and/or any VM should be granted read permission and write permissions (e.g., read-write permissions) to the partition "p_001."

Figure 3:
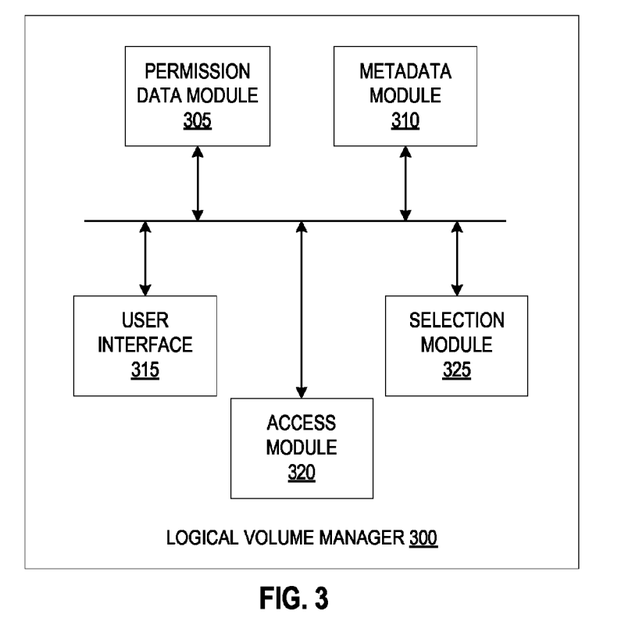
FIG. 3 is a block diagram illustrating a logical volume manager (LVM), according to an embodiment.

FIG. 3 is a block diagram illustrating an LVM 300, according to an embodiment. The LVM 300 may include a permission data module 305, a metadata module 310, a user interface 315, an access module 320, and a selection module 325. More or less components may be included in the logical volume manager 300 without loss of generality. For example, two of the modules may be combined into a single module, or one of the modules may be divided into two or more modules. In one embodiment, one or more of the modules in the LVM 300 may reside on different computing systems (e.g., different server computers). In one embodiment, the LVM 300 may access storage locations (e.g., logical volumes, etc.) in a logical data storage (e.g., access one or more logical volumes that use one or more drives) using one or more of metadata and permission data.

The permission data module 305 may generate permission data (e.g., permission data 136 as shown in FIG. 1). For example, the permission data module may generate permission data based on an identifier for a user, a VM, and/or a computing device. In another example, the permission data module 305 may generate permission data based on input received from a user (e.g., based on user input). The user input may be received via the user interface 315, as discussed below. In one embodiment, the permission data module 305 may receive storage locations, permissions for the storage locations, and/or identifiers from another computing device (e.g., from host controller 107 as shown in FIG. 1). For example, a system administrator may use a different computing device to generate permission data and may transmit the permission data to the LVM 300 and the permission data module 305 may receive the permission data. In one embodiment, the permission data module 305 may analyze and/or process the permission data to identify and/or determine a set of permissions (e.g., read permissions, read and write permissions, no permissions) for a storage location.

The metadata module 310 may access metadata stored on a drive when the LVM 300 accesses a storage location (e.g., a logical volume) in the logical data storage. For example, when the LVM 300 is accessing a file (e.g., reading a file) stored on a drive in the logical data storage, the metadata module 310 may access the metadata stored on the drive. In one embodiment, the metadata module 310 may analyze the metadata associated with a storage location and may determine and/or identify a set of permissions for the storage location. The metadata module 310 may also update, modify, and/or add new metadata to the logical data storage. For example, if the LVM 300 updates a logical volume (e.g., increases the size of logical volume 161 as shown in FIG. 1), the metadata module 310 may update the metadata for the logical volume.

The access module 320 may process requests to access storage locations received from VMs and/or computing devices. For example, a VM may send a request to access a storage location, such as a logical volume, and the access module 320 may process the request to access the logical volume. In one embodiment, the access module 320 may use sets of permissions determined and/or obtained from metadata and/or permission data to determine whether the request should be granted. For example, the metadata may indicate that the logical volume has read and write permissions (e.g., both read operations and write operations are allowed to the logical volume). However, the local permission data for the LVM 300 may indicate that the logical volume has read-only permissions (e.g., read operations are allowed but write operations are not allowed). The access module 320 may override the set of permissions in the metadata with the set of permissions in the local permission data and may only grant the VM read-only access to the logical volume. In another example, the permission data may not include a set of permissions associated with a particular storage location such as a logical volume. If the permission data does not include permissions for the logical volume, the access module 320 may use the set of permissions from the metadata associated with the logical volume, when granting access to the logical volume.

The user interface 315 may be a graphical user interface that allows a user to provide input for generating permission data. For example, a user may use the user interface 315 to indicate a storage location, a set of permissions (e.g., read permissions, no permissions, etc.) for the storage location, and an identifier (e.g., a username, a name for a VM or a computing device) associated with the storage location and the set of permissions. The user interface 315 may present one or more graphical user interface elements (e.g., text, images, numbers, buttons, radio buttons, lists, text fields, graphs, icons, menus, drop down menus, etc.) to the user. The user interface 315 may receive user input (e.g., may receive button clicks, text typed in a text field) and the LVM 300 may generate permission data based on the user input received via the user interface 315.

As discussed above, in one embodiment, multiple LVMs may use a logical data storage. The multiple LVMs may work in combination to select one of the LVMs (e.g., to perform a selection process) to be a managing LVM (e.g., an LVM that has the ability to update and/or modify the logical data storage and/or metadata for the logical data storage. For example, the different LVMs may use a leader election algorithm to determine which LVM should be the managing LVM. In another example, the different LVMs may transmit messages to each other or to a central server indicating whether a respective LVM should operate as the managing LVM (e.g., an LVM may need to operate as the managing LVM in order to update the structure of the logical data storage). The different LVMs may select an LVM to operate as the managing LVM based on the order in which the messages are received. The selection module 325 may perform the selection process when multiple LVMs share a logical data storage. For example, the selection module 325 may use a leader election algorithm in conjunction with other selection modules in other LVMs to select one LVM that will operate as a managing LVM.

Figure 4:
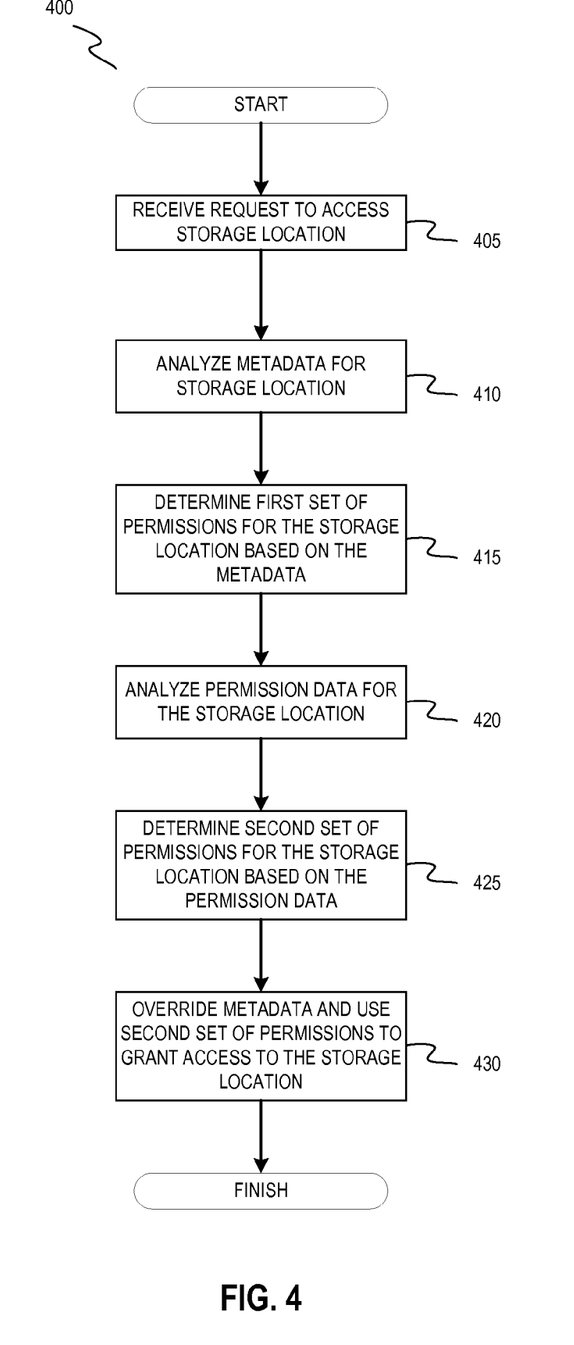
FIG. 4 is a flow diagram illustrating a method of managing permissions for a logical data storage, according to one embodiment.
Figure 5:
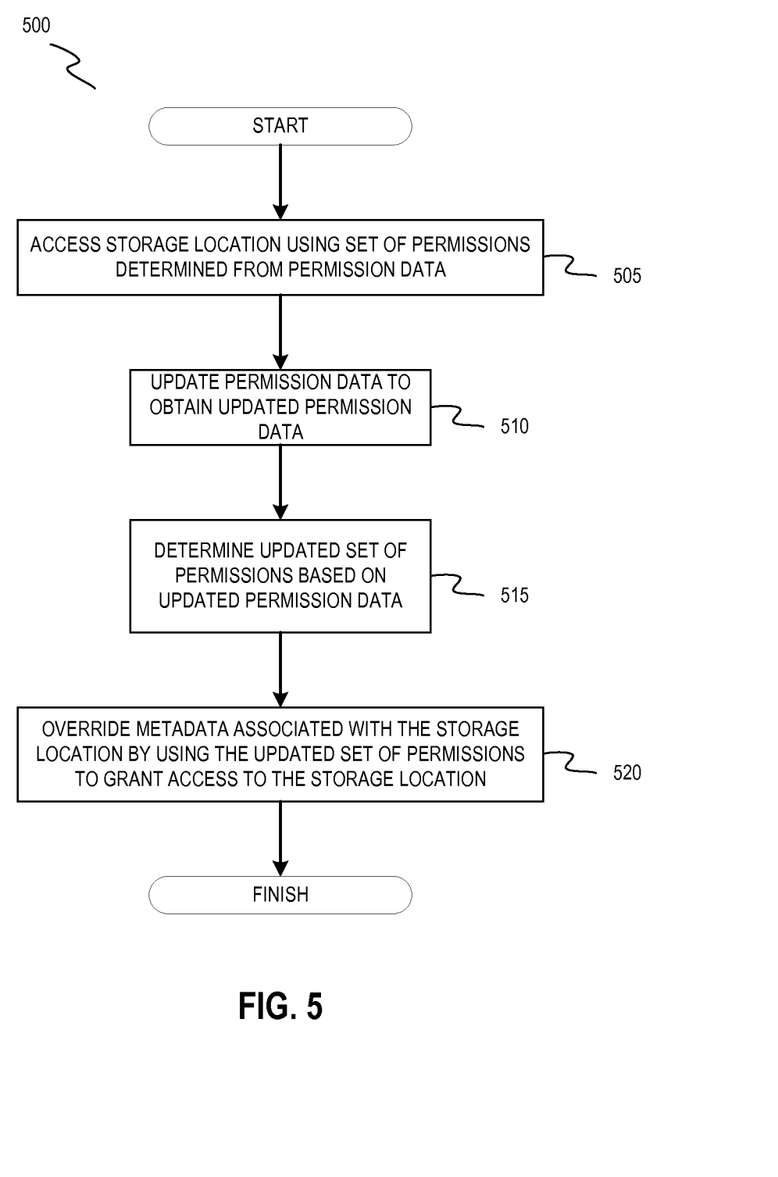
FIG. 5 is a flow diagram illustrating a method of managing permissions for a logical data storage, according to another embodiment.

FIGS. 4-5 are flow diagrams illustrating methods of managing permissions for a logical data storage. For simplicity of explanation, the methods are depicted and described as a series of acts. However, acts in accordance with this disclosure can occur in various orders and/or concurrently and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

FIG. 4 is a flow diagram illustrating a method 400 of managing permissions for a logical data storage, according to one embodiment. The method 400 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 400 may be performed by an LVM (e.g., the LVM 300 of FIG. 3).

Referring to FIG. 4, the method 400 starts at block 405 with the LVM receiving a request to access a storage location in a logical volume. For example, the LVM may receive a request from a VM and/or a computing device to access a directory in a logical volume managed by the LVM. At block 410, the LVM analyzes the metadata for the storage location (e.g., the metadata used by the LVM to access the storage location). The LVM determines and/or identifies a first set of permissions for the storage location based on the metadata (block 415). For example, the LVM may determine that the directory has read and write permissions (e.g., both read operations and write operations are allowed to the logical volume) based on the metadata.

At block 420, the LVM may analyze permission data for the storage location. At block 425, the LVM may determine a second set of permissions for the storage location based on the permission data. For example, the LVM may access permission data that is locally stored to identify permissions that are associated with the logical volume. The LVM overrides the metadata (e.g., overrides the first set of permissions in the metadata) and uses the second set of permissions from the permission data to grant access to the storage location (block 430). For example, although the metadata may indicate that the logical volume has read and write permissions, the permission data may indicate that the logical volume has read-only permissions. The LVM may override the metadata and grant a VM read only access to the directory based on the permission data. After block 430, the method 400 ends.

FIG. 5 is a flow diagram illustrating a method 500 of managing permissions for a logical data storage, according to another embodiment. The method 500 may be performed by processing logic that may include hardware (e.g., circuitry, dedicated logic, programmable logic, microcode, etc.), software (e.g., instructions run on a processing device to perform hardware simulation), or a combination thereof. In one embodiment, the method 500 may be performed by an LVM (e.g., the LVM 300 of FIG. 3). In another embodiment, the method 500 may be performed after the method 400 of FIG. 4.

Referring to FIG. 5, the method 500 starts at block 505 with the LVM accessing a storage location using a set of permissions determined from permission data (e.g., local permission data for a host) associated with the storage location. At block 510, the LVM may update the permission data to obtain updated permission data. For example, the LVM may receive a message identifying a new set of permissions for a storage location and the LVM may update the local permission data to include the new set of permissions (e.g., may add write permissions to the local permission data where the local permission data previously allowed read-only permissions). In another example, the LVM may receive new permission data from another computing device (e.g., from a computer server) and may update the local permission data by replacing the previous local permission data with the new local permission data received from the computing device. The LVM may determine and/or identify an updated set of permissions for the storage location based on the updated permission data (block 515). At block 520, the LVM may override the metadata associated with the storage location (e.g., override the permissions in the metadata) by using the updated set of permissions from the updated local permission data, to grant access to the storage location. After block 520, the method 500 ends.

Figure 6:
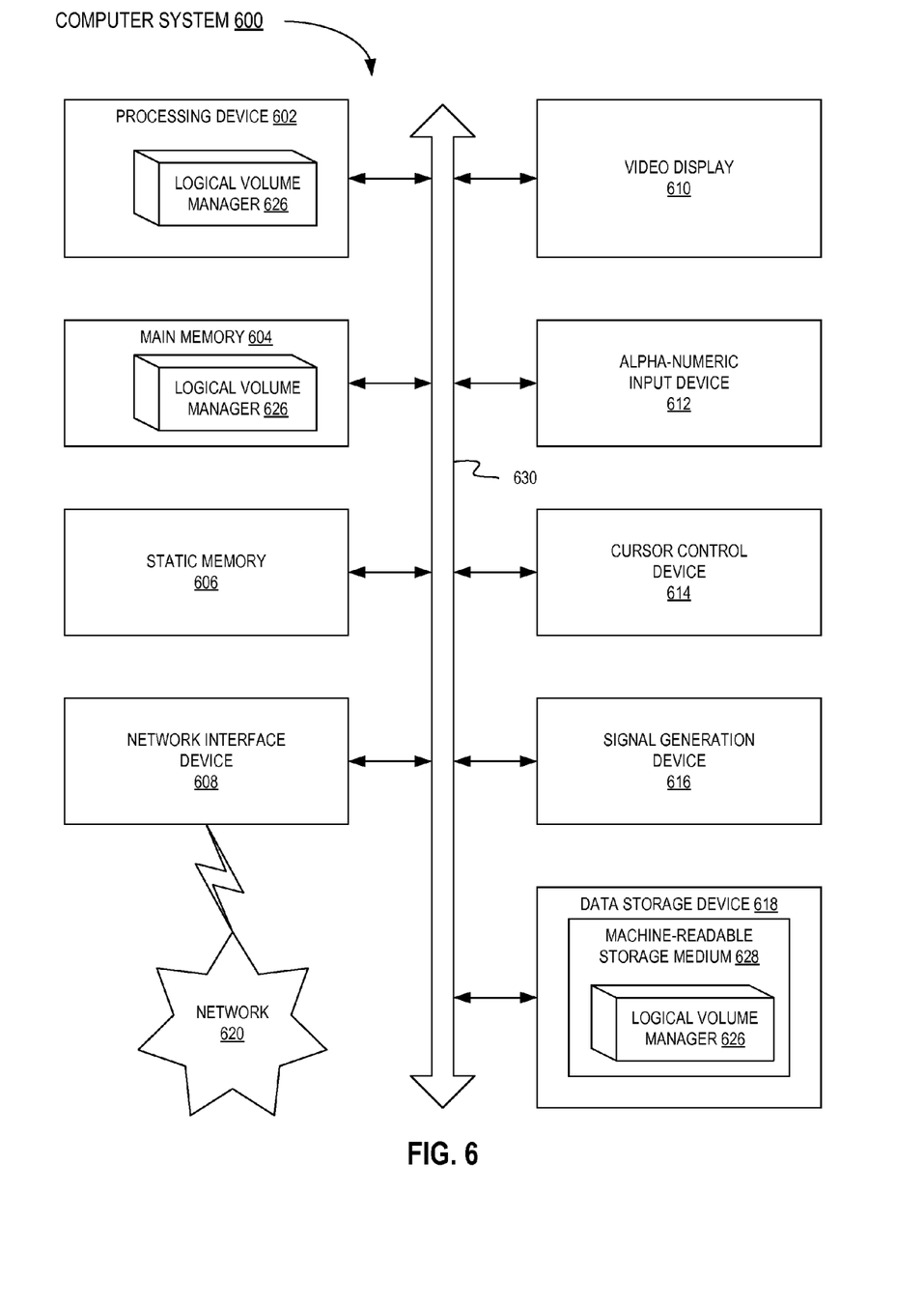
FIG. 6 illustrates a diagrammatic representation of a machine in the example form of a computer system, in accordance with one embodiment.

FIG. 6 illustrates a diagrammatic representation of a machine in the example form of a computer system 600 (e.g., a computing device) within which a set of instructions, for causing the machine to perform any one or more of the methodologies discussed herein, may be executed. The system 600 may be in the form of a computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in a client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the LVM 626 for performing the operations and steps discussed herein.

The computer system 600 may further include a network interface device 608 which may communicate with a network 620. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one embodiment, the video display unit 610, the alphanumeric input device 612, and the cursor control device 614 may be combined into a single component or device (e.g., an LCD touch screen).

The data storage device 618 may include a computer-readable storage medium 628 on which is stored one or more sets of instructions (e.g., instructions of LVM 626) embodying any one or more of the methodologies or functions described herein. The LVM 626 may also reside, completely or at least partially, within the main memory 604 and/or within the processing device 602 during execution thereof by the computer system 600, the main memory 604 and the processing device 602 also constituting or including computer-readable media. The instructions may further be transmitted or received over a network 620 via the network interface device 608.

While the computer-readable storage medium 628 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "analyzing," "determining," "overriding," "updating," "generating," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, compact disc-read-only memories (CD-ROMs) and magnetic-optical disks, read-only memories (ROMs), random access memories (RAMs), erasable programmable read only memories (EPROMs), electrically erasable programmable read only memories (EEPROMs), magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will be apparent from the description presented herein. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely examples. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   receiving, by a processing device executing a first logical volume manager (LVM) of a plurality of LVMs, a request to access a storage location in a logical volume;
   analyzing, by the processing device, global metadata associated with the storage location, wherein the global metadata pertains to the all LVMs in the plurality of LVMs;
   identifying, by the processing device, a first set of permissions for the storage location, the first set of permissions comprised in the global metadata;
   analyzing, by the processing device, local permission data associated with the storage location, wherein the local permission data pertains to the first LVM;
   identifying, by the processing device, a second set of permissions for the storage location, the second set of permissions comprised in the local permission data, wherein the second set of permissions is created independently from the first set of permissions, wherein the first set of permissions is different from the second set of permissions; and
   in response to identifying the second set of permissions, granting, by the processing device, access to the storage location by using the second set of permissions in place of the first set of permissions.

2. The method of claim 1, wherein the request to access the storage location is received from at least one of a virtual machine or a computing device that uses the logical volume.

3. The method of claim 1, further comprising:
   receiving a second request to access a second storage location in the logical volume;
   analyzing a second global metadata associated with the second storage location;
   identifying a third set of permissions for the second storage location, the third set of permissions comprised in the second global metadata;
   analyzing second local permission data associated with the second storage location;
   identifying a fourth set of permissions for the second storage location, the fourth set of permissions comprised in the second local permission data, wherein the third set of permissions is different from the fourth set of permissions; and
   overriding the second global metadata by using the fourth set of permissions to grant access to the second storage location.

4. The method of claim 1, further comprising:
   updating the local permission data;
   receiving a second request to access the storage location;
   identifying a third set of permissions for the storage location, the third set of permissions comprised in the updated local permission data; and
   overriding the global metadata by using the third set of permissions to grant access to the storage location.

5. The method of claim 1, wherein the storage location comprises one or more of a file, a directory, a volume, a volume group, a partition, or a set of data blocks.

6. The method of claim 1, further comprising:
   generating the local permission data.

7. The method of claim 6, wherein the local permission data is generated in view of an identifier for one or more of a virtual machine, a computing device, or a user.

8. The method of claim 6, wherein the local permission data is generated in view of user input, wherein the user input indicates one or more of the storage location, the second set of permissions, or an identifier.

9. A system comprising:
   a memory to store data; and
   a processing device operatively coupled to the memory, the processing device to:
   receive, by a processing device executing a first logical volume manager (LVM) of a plurality of LVMs, a request to access a storage location in a logical volume;
   analyze, by the processing device, global metadata associated with the storage location, wherein the global metadata pertains to the all LVMs in the plurality of LVMs;
   identify, by the processing device, a first set of permissions for the storage location, the first set of permissions comprised in the global metadata;
   analyze, by the processing device, local permission data associated with the storage location, wherein the local permission data pertains to the first LVM;
   identify, by the processing device, a second set of permissions for the storage location, the second set of permissions comprised in the local permission data, wherein the second set of permissions is created independently from the first set of permissions, wherein the first set of permissions is different from the second set of permissions; and in response to identifying the second set of permissions, grant, by the processing device, access to the storage location by using the second set of permissions in place of the first set of permissions.

10. The system of claim 9, the processing device to:
receive a second request to access a second storage location in the logical volume;
analyze a second global metadata associated with the second storage location;
identify a third set of permissions for the second storage location, the third set of permissions comprised in the second global metadata;
analyze a second local permission data associated with the second storage location;
identify a fourth set of permissions for the second storage location, the fourth set of permissions comprised in the second local permission data, wherein the third set of permissions is different from the fourth set of permissions; and
override the second global metadata by using the fourth set of permissions to grant access to the second storage location.

11. The system of claim 9, the processing device to:
update the local permission data;
receive a second request to access the storage location;
identify a third set of permissions for the storage location, the third set of permissions comprised in the updated local permission data; and
override the global metadata by using the third set of permissions to grant access to the storage location.

12. The system of claim 9, the processing device to:
generate the local permission data.

13. The system of claim 12, the processing device to generate the local permission data comprising an identifier for one or more of a virtual machine, a computing device, or a user.

14. The system of claim 12, the processing device to generate the local permission data comprising user input, wherein the user input indicates one or more of the storage location, the second set of permissions, or an identifier.

15. A non-transitory computer readable storage medium having instructions that, when executed by a processing device, cause the processing device to:
receive, by a processing device executing a first logical volume manager (LVM) of a plurality of LVMs, a request to access a storage location in a logical volume;
analyze, by the processing device, global metadata associated with the storage location, wherein the global metadata pertains to the all LVMs in the plurality of LVMs;
identify, by the processing device, a first set of permissions for the storage location, the first set of permissions comprised in the global metadata;
analyze, by the processing device, local permission data associated with the storage location, wherein the local permission data pertains to the first LVM;
identify, by the processing device, a second set of permissions for the storage location, the second set of permissions comprised in the local permission data, wherein the second set of permissions is created independently from the first set of permissions, wherein the first set of permissions is different from the second set of permissions; and
in response to identifying the second set of permissions, grant, by the processing device, access to the storage location by using the second set of permissions in place of the first set of permissions.

16. The non-transitory computer readable storage medium of claim 15, the processing device to:
receive a second request to access a second storage location in the logical volume;
analyze a second global metadata associated with the second storage location;
identify, by the logical volume manager, a third set of permissions for the second storage location, the third set of permissions comprised in the second global metadata;
analyze second local permission data associated with the second storage location;
identify a fourth set of permissions for the second storage location, the fourth set of permissions comprised in the second local permission data, wherein the third set of permissions is different from the fourth set of permissions; and
override the second global metadata by using the fourth set of permissions to grant access to the second storage location.

17. The non-transitory computer readable storage medium of claim 15, the processing device to:
update the local permission data;
receive a second request to access the storage location;
determine a third set of permissions for the storage location based on the updated local permission data; and
override the global metadata by using the third set of permissions to grant access to the storage location.

18. The non-transitory computer readable storage medium of claim 15, the processing device to:
generate the local permission data.

19. The non-transitory computer readable storage medium of claim 18, wherein the generated local permission data comprises an identifier for one or more of a virtual machine, a computing device, or a user.

20. The non-transitory computer readable storage medium of claim 18, wherein the generated local permission data comprises user input, wherein the user input indicates one or more of the storage location, the second set of permissions, or an identifier.

* * * * *